United States Patent [19]
Holm

[11] Patent Number: 6,087,867
[45] Date of Patent: Jul. 11, 2000

[54] TRANSACTION CONTROL CIRCUIT FOR SYNCHRONIZING TRANSACTIONS ACROSS ASYNCHRONOUS CLOCK DOMAINS

[75] Inventor: Jeffrey J. Holm, Edina, Minn.

[73] Assignee: LSI Logic Corporation, Milpitas, Calif.

[21] Appl. No.: 09/087,673

[22] Filed: May 29, 1998

[51] Int. Cl.$^7$ ...................................................... H03L 7/00
[52] U.S. Cl. .......................... 327/144; 327/141; 327/142; 327/198
[58] Field of Search ..................... 327/141, 142, 327/143, 144, 145, 146, 198; 713/400

[56] References Cited

U.S. PATENT DOCUMENTS

| | | | |
|---|---|---|---|
| 4,847,750 | 7/1989 | Daniel | 364/200 |
| 4,979,192 | 12/1990 | Shimizume et al. | 375/111 |
| 5,155,745 | 10/1992 | Sugawara et al. | 375/110 |
| 5,163,136 | 11/1992 | Richmond | 395/215 |
| 5,388,250 | 2/1995 | Lewis et al. | 327/141 |
| 5,414,813 | 5/1995 | Shiobara | 395/200 |
| 5,542,110 | 7/1996 | Minagawa | 395/281 |
| 5,619,156 | 4/1997 | Jandu | 327/198 |
| 5,619,497 | 4/1997 | Gallagher et al. | 370/394 |
| 5,625,309 | 4/1997 | Fucili et al. | 327/217 |
| 5,652,536 | 7/1997 | Nookala et al. | 327/298 |
| 5,717,952 | 2/1998 | Christiansen et al. | 395/842 |
| 5,894,240 | 4/1999 | Shieh et al. | 327/143 |
| 5,898,640 | 4/1999 | Ben-Meir et al. | 327/145 |

OTHER PUBLICATIONS

"MU95C5480 LANCAM," *Music Semiconductors*, Rev. 0, pp. 1–12. (Jul. 22, 1994).
"Information technology—Telecommunications and information exchange between systems—High–level data link control (HDLC) procedures—Elements of procedures," *ISO/IEC 4335*, Fifth edition. (Dec. 15, 1993).
"Information technology—Telecommunications and information exchange between systems—High–level data link control (HDLC) procedures—Frame structure," *ISO/IEC 3309*, FIfth edition. (Dec. 15, 1993).
W. Simpson, Editor, Daydreamer, "PPP in HDLC–like Framing," pp. 1–25, (last modified Jul. 1994) <ftp://ds.internic.net/rfc>.

*Primary Examiner*—Timothy P. Callahan
*Assistant Examiner*—An T. Luu
*Attorney, Agent, or Firm*—Westman, Champlin & Kelly, P.A.

[57] ABSTRACT

A transaction control circuit includes an initiate control circuit and a busy control circuit which are coupled between an initiate input, an initiate output, a busy input and busy output. The initiate control circuit sets the initiate output to an active state when the initiate input transitions from an inactive state to an active state and holds the initiate output in the active state until the initiate control circuit senses a transition in the busy input from an inactive state to an active state. The busy control circuit sets the busy output to an active state when either the initiate output is in the active state or the busy input is in the active state.

10 Claims, 3 Drawing Sheets

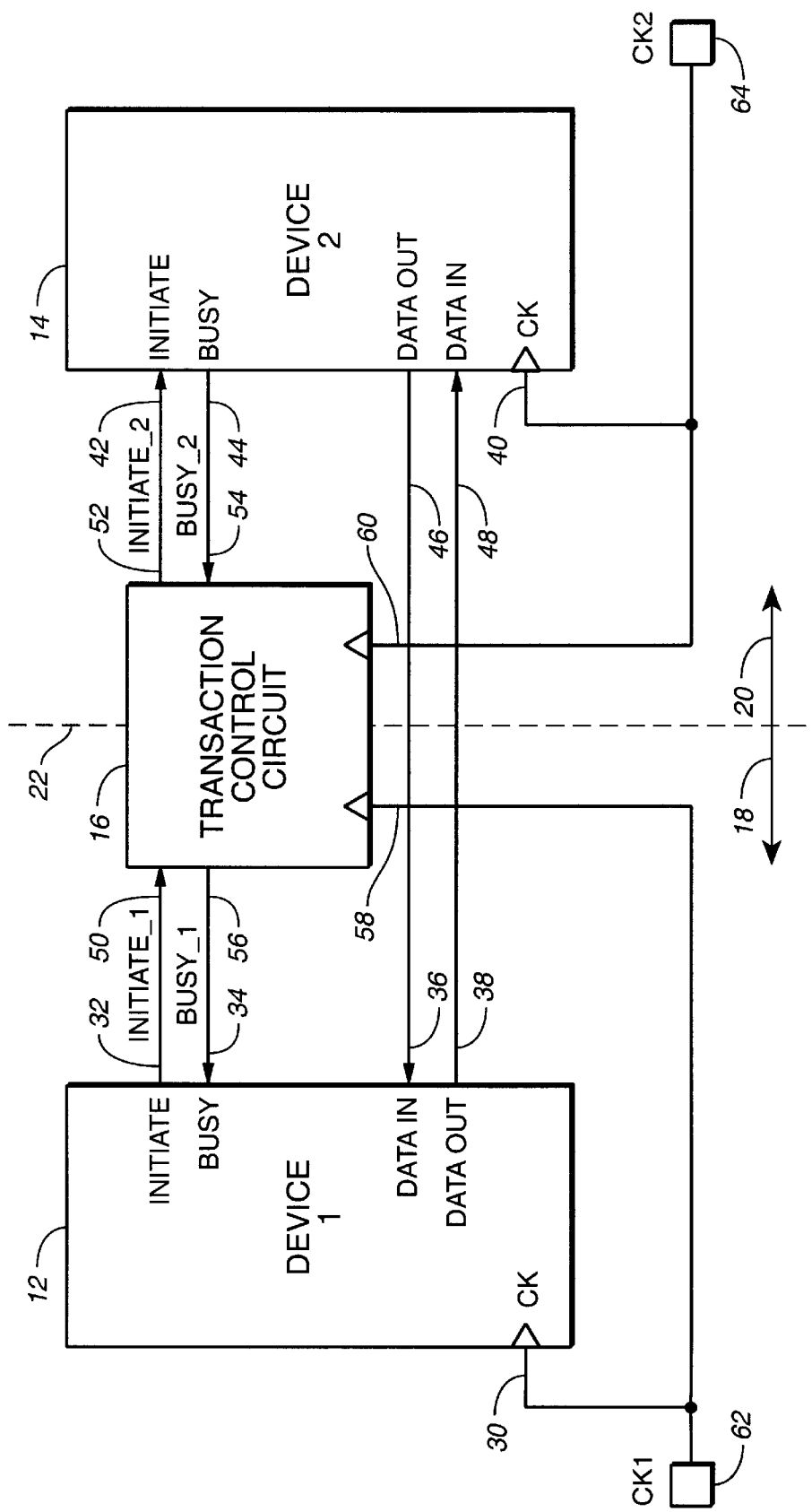
FIG._1

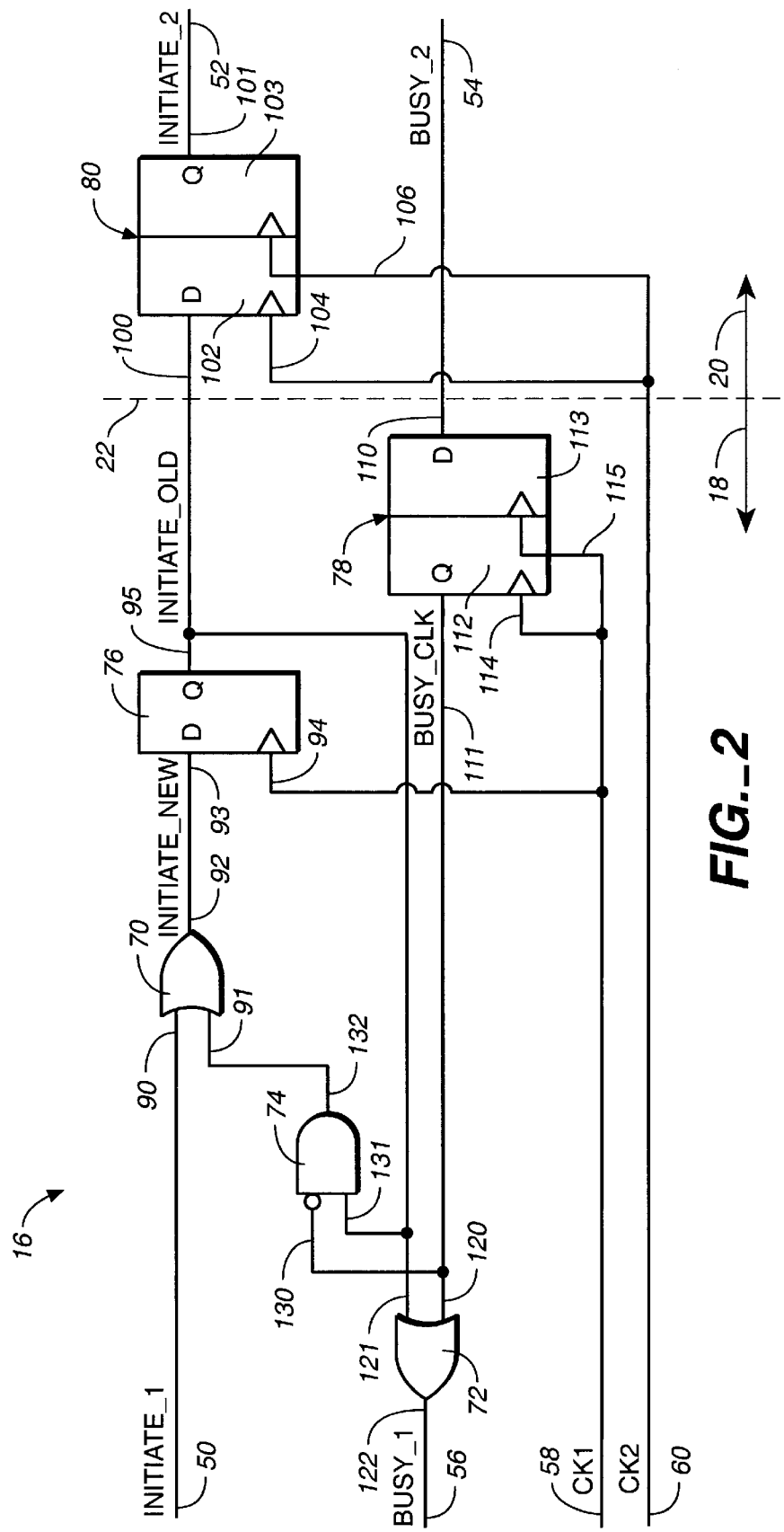
FIG._2

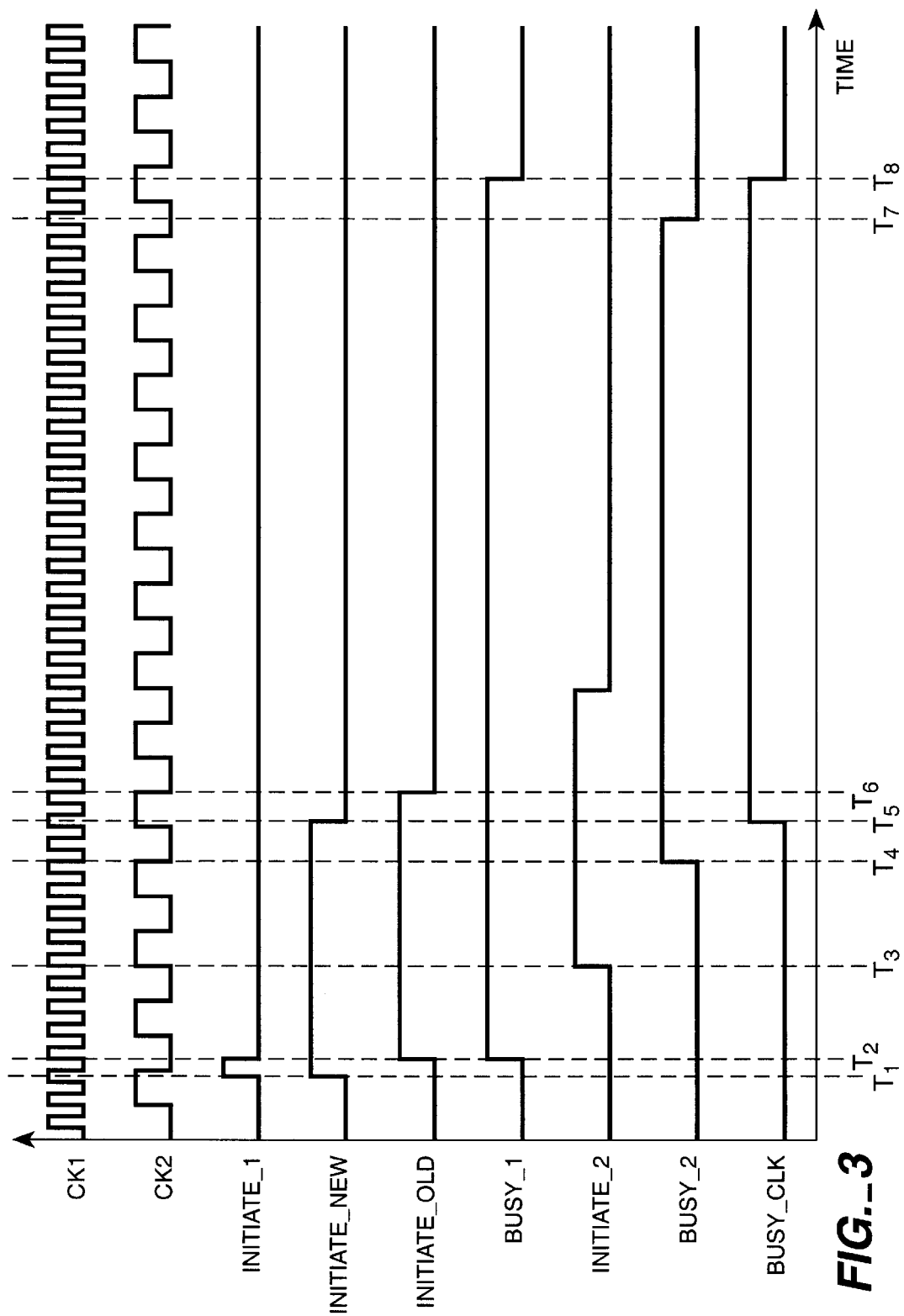
FIG._3

TRANSACTION CONTROL CIRCUIT FOR SYNCHRONIZING TRANSACTIONS ACROSS ASYNCHRONOUS CLOCK DOMAINS

BACKGROUND OF THE INVENTION

The present invention relates to integrated circuits and, more particularly, to a transaction control circuit for synchronizing transactions across asynchronous clock domains.

Integrated circuits such as application specific integrated circuits (ASICs) often include a functional device, such as a microprocessor, which interfaces with one or more other functional devices that operate within different clock domains. For example, the microprocessor may be required to read and write configuration registers in a local area network (LAN) controller, which may be located on the same integrated circuit or on a separate integrated circuit. If the microprocessor is synchronized with a first clock signal and the LAN controller is synchronized with a second clock signal, which is asynchronous to the first clock signal, the handshaking signals passing back and forth between the microprocessor and the LAN controller must be resynchronized in each clock domain.

To initiate a transaction, such as a write or read operation, the microprocessor sets and later clears a transaction initiate bit (e.g. a read bit) in a register on the integrated circuit. The output of the register is synchronized with the second clock signal in the second clock domain and then provided to the LAN controller. The LAN controller responds by asserting a "busy" signal, which indicates that the transaction has not yet completed. In the case of a read transaction, the LAN controller asserts the busy signal until the requested data is ready to be retrieved, at which time the LAN controller deasserts the busy signal. The busy signal is resynchronized with the first clock signal and then provided to the microprocessor. The microprocessor periodically polls the busy signal to determine when the data is available.

Resynchronizing the initiate and busy signals results in a delay across the clock domains. Therefore, it is possible for the microprocessor to set the initiate signal and then poll the busy signal before the busy signal is set within the first clock domain. As a result, the microprocessor may determine prematurely that the requested transaction is complete and then read the data before the data is valid.

Traditional methods of implementing the handshaking of the initiate and busy signals between two clock domains to avoid transaction errors can become complex and consume a significant number of logic gates or software instructions. An improved structure and method of implementing the initiate and busy signals are desired.

SUMMARY OF THE INVENTION

The transaction control circuit of the present invention includes an initiate control circuit and a busy control circuit which are coupled between an initiate input, an initiate output, a busy input and busy output. The initiate control circuit sets the initiate output to an active state when the initiate input transitions from an inactive state to an active state and holds the initiate output in the active state until the initiate control circuit senses a transition in the busy input from an inactive state to an active state. The busy control circuit sets the busy output to an active state when either the initiate output is in the active state or the busy input is in the active state.

In another aspect of the present invention, the transaction control circuit includes a first logic-OR circuit, a flip-flop, a logic-AND circuit and a second logic-OR circuit. The first OR gate includes first and second inputs and an output, wherein the first input is coupled to the initiate input. The flip-flop includes a data input which is coupled to the output of the first logic or circuit and a data output which forms the initiate output. The logic-AND includes a non-inverting input which is coupled to the initiate output, an inverting input which is coupled to the busy input and an output which is coupled to the second input of the first logic-OR circuit. The second logic-OR circuit includes a first input which is coupled to the initiate output, a second input which is coupled to the busy input and an output which forms the busy output.

BRIEF DESCRIPTION OF THE DRAWINGS

FIG. 1 is a simplified block diagram of two functional devices which are coupled together through a transaction control circuit according to one embodiment of the present invention.

FIG. 2 is a schematic diagram of the transaction control circuit shown in FIG. 1.

FIG. 3 is a waveform diagram which shows various waveforms in the transaction control circuit during a typical transaction initiation cycle.

DETAILED DESCRIPTION OF THE PREFERRED EMBODIMENTS

FIG. 1 is a simplified block diagram of two functional devices 12 and 14 which are coupled together through a transaction control circuit 16 according to one embodiment of the present invention. Functional device 12 operates within a first clock domain 18, while functional device operates within a second clock domain 20, which is asynchronous to the first clock domain 18. The border between clock domains 18 and 20 is represented by dashed line 22. Transaction control circuit 16 synchronizes handshaking signals between devices 12 and 14 to the respective clock domains when device 12 initiates a transaction, such as a read or write operation, with device 14.

Functional devices 12 and 14 can include a variety of devices that interface with one another over asynchronous clock domains 18 and 20. For example, functional device 12 can include a microprocessor. Functional device 14 can include a data communication interface device such as a local area network (LAN) controller or a serial wide area network (WAN) controller which has configuration registers that are read from and written to by device 12.

Device 12 includes clock input 30, transaction initiate output 32, transaction busy input 34, data input 36 and data output 38. Device 14 includes clock input 40, transaction initiate input 42, transaction busy output 44, data output 46 and data input 48. Transaction control circuit 16 includes initiate input 50, initiate output 52, busy input 54, busy output 56 and clock inputs 58 and 60. Clock input 30 of device 12 is coupled to clock terminal 62 for receiving clock signal CK1 within clock domain 18. Clock input 40 of device 14 is coupled to clock terminal 64 for receiving clock signal CK2 within clock domain 20. Clock signal CK1 and CK2 are asynchronous with one another. Clock inputs 58 and 60 of transaction control circuit 16 are coupled to clock terminals 62 and 64, respectively.

When device 12 wishes to initiate a transaction on or through device 14, device 12 asserts an initiate signal, initiate_1, on output 32 to an active state (e.g. a logic "1" or "high" state). Device 12 then periodically polls busy input 34 to determine when the requested transaction has been completed. Transaction control circuit 16 receives initiate_1 on initiate input 50, synchronizes the initiate signal to clock signal CK2 and responsively generates initiate_2 on output 52, which is coupled to initiate input 42 of device 14. Device 14 receives initiate_2 and responsively asserts busy_2 on busy output 58 to an active state to indicate that the requested transaction has not yet completed.

Transaction control circuit 16 receives busy_2 on busy input 54, synchronizes the busy signal with clock signal CK1 and responsively generates busy_1 on busy output 56. Device 12 receives busy_1 on busy input 34. When device 14 has completed the requested transaction, device 14 resets busy_2 to an inactive state (e.g. a logic "0" or "low" state). If the requested transaction were a read, the requested data would now be valid on data output 46. Device 12 detects that busy_1 is inactive and completes the read transaction through data input 36. If the requested transaction were a write, the inactive state of busy_1 indicates that the write transaction is now complete and device 14 is ready for another transaction.

The synchronizing circuitry within transaction control circuit 16 causes delays in the initiate and busy signals being passed back and forth across clock boundary 22. In order to ensure that device 12 does not detect an inactive state on busy input 34 just after device 12 activates initiate_1, transaction control circuit 16 activates busy_1 immediately after initiate_1 becomes active without waiting for the busy signal to arrive from device 14. Transaction control circuit 16 holds busy_1 active until_2 becomes inactive state indicating that device 14 has completed the transaction.

Transaction control circuit 16 also holds initiate_2 active until the active state of busy_2 is detected within clock domain 18 and then allows initiate_2 to reset. This insures that the initiate_2 does not reset before device 14 has had a chance to detect the active state due to the differences in clock signals CK1 and CK2 and the delay through transaction control circuit 16. For example, in embodiments in which device 12 and transaction control circuit 16 are fabricated on an integrated circuit, such as an application specific integrated circuit (ASIC), and device 14 is external to the integrated circuit, device 14 may not be capable of running at the clock speeds achieved within the integrated circuit. Clock signal CK1 may therefore be significantly faster than clock signal CK2. Transaction control circuit 16 synchronizes the handshaking signals to each clock signal and ensures that no transaction errors occur.

FIG. 2 is a schematic diagram of transaction control circuit 16. Transaction control circuit 16 includes OR gates (or circuits) 70 and 72, AND gate 74, flip-flop 76 and synchronizing circuits 78 and 80. OR gate 70 includes inputs 90 and 91 and output 92. Input 90 is coupled to initiate input 50 for receiving initiate_1. Output 92 generates an initiate_new signal which is coupled to data input 93 of flip-flop 76. Flip-flop 76 has a clock input 94 which is coupled to clock input 58 for receiving clock signal CK1. Flip-flop 76 has a data output 95 which is coupled to data input 100 of synchronizing circuit 80 and generates an initiate_old signal which is updated as a function of the clock signal CK1 received on clock input 94. In one embodiment of the present invention, flip-flop 76 includes an edge-triggered D-type flip-flop. However, other types of flip-flops or register circuits can also be used.

Synchronizing circuit 80 receives the initiate_old signal on data input 100, synchronizes the signal to clock signal CK2, which is received on clock inputs 104 and 106, and generates a synchronized initiate signal, initiate_2, on output 101. Output 101 is coupled to initiate output 52 of transaction control circuit 16. In one embodiment, synchronizing circuit 80 includes back-to-back D-type flip-flops 102 and 103 which are coupled between data input 100 and data output 101. Other types and numbers of flips-flops or latch circuits can also be used within synchronizing circuit 80, which may have various configurations.

Synchronizing circuit 78 is similar to synchronizing circuit 80 and includes data input 110, data output 111, D-type flip-flops 112 and 113, and clock inputs 114 and 115. Data input 110 is coupled to busy input 54 for receiving busy signal busy_2. Synchronizing circuit 78 synchronizes busy_2 to clock signal CK1, which is received on clock inputs 114 and 115, and generates a synchronized busy signal, busy_clk, on output 111. Output 111 is coupled to input 120 of OR gate 72. Input 121 of OR gate 72 is coupled to output 95 of flip-flop 76. Output 122 of OR gate 72 is coupled to busy output 56. AND gate 74 has an inverting input 130 which is coupled to output 111 of synchronizing circuit 80, a non-inverting input 131 which is coupled in a feedback path to output 95 of flip-flop 76, and an output 132 which is coupled to input 91 of OR gate 70.

FIG. 3 is a waveform diagram which shows various waveforms in transaction control circuit 16 during a typical transaction initiation cycle. In this example, clock signal CK2 has a lower frequency than clock signal CK1 and is asynchronous to clock signal CK1. At time T1, device 12 asserts initiate_1 to an active, logic high state. The high signal at input 90 of OR gate 70 causes initiate_new to go high. At time T2, on the next rising edge of clock signal CK1, flip-flop 76 registers initiate_new, which causes initiate_old to go high. Initiate_old is fed back to input 121 of OR gate 72. This forces busy_1 to transition from an inactive, logic low state to an active, logic high state as soon as initiate_old goes high, at time T2. This eliminates the possibility of device 12 reading an incorrect value of busy_1 before device 14 has had a chance to set busy_2 on busy input 54.

Synchronizing circuit 80 synchronizes the rising edge of initiate_old with clock signal CK2 in clock domain 20. After the next two rising edges of clock signal CK2, the active state of initiate_old propagates to output 101, and initiate_2 goes high, at time T3. To ensure that the logic high level on initiate_old does not disappear before being registered by flip-flops 102 and 103, initiate_old is fed back to input 131 of AND gate 76. As long as busy_clk is in an inactive, logic low state, AND gate 74 generates a logic high level on output 132 which holds initiate_new high even if initiate_1 is reset by device 12 or by peripheral hardware logic.

At time T4, device 14 asserts busy_2 to an active, logic high state. Synchronizing circuit 78 synchronizes busy_2 with clock signal CK1 in clock domain 18. After the next two rising edges of clock signal CK1, busy_2 propagates to output 111, and busy_clk goes high, at time T5. Once busy_clk goes high, busy_clk holds busy_1 high through output 122 of OR gate 72. Also, the logic high level on busy_clk resets output 132 of AND gate 74 to a logic low level which allows initiate_new on output 92 of OR gate 70 to reset at time T5. At the next rising edge of clock signal CK1, initiate_old is reset to the inactive, low state at time T6.

At time T7, device 14 has completed the requested transaction and resets busy_2. At time T8, busy_clk and busy_1 go low. Device 12 detects the low level on busy_1 and, if the requested transaction is a read, reads valid data from data output 46 of device 14. If the requested transaction is a write, device 12 writes data to data input 48 of device 14.

The following truth table shows the function performed by OR gates 70 and 72 and AND gate 74.

TABLE 1

| initiate__1 | busy__clk | initiate__old | initiate__new | busy__1 |
|---|---|---|---|---|
| 0 | 0 | 0 | 0 | 0 |
| 0 | 0 | 1 | 1 | 1 |
| 0 | 1 | 0 | 0 | 1 |
| 0 | 1 | 1 | 0 | 1 |
| 1 | 0 | 0 | 1 | 0 |
| 1 | 0 | 1 | 1 | 1 |
| 1 | 1 | 0 | 1 | 1 |
| 1 | 1 | 1 | 1 | 1 |

The transaction control circuit of the present invention significantly improves the manner in which a device such as a microprocessor can communicate with other devices across asynchronous clock domains. The transaction control circuit of the present invention forces initiate__old and busy__1 to transition from an inactive state to an active state at the same time. This eliminates any gap between these two signals that would otherwise be caused by delays in the synchronizing circuitry between the two clock domains and therefore removes the possibility that device 12 can read an incorrect value of busy__1. Initiate__old is guaranteed to be seen in the second clock domain since this signal is not cleared until the returned busy__clk is seen in the first clock domain.

The transaction control circuit of the present invention has a very low complexity and can therefore be implemented with a relatively small number of logic gates and flip-flops. This minimizes the area consumed on the die of the integrated circuit in which the device is fabricated. This also reduces the chance of design errors and improves testability of the corresponding circuitry. Another advantage of the transaction control circuit of the present invention is that the microprocessor software no longer has to keep track of the delays in order to time when the initiate signal can safely be reset. The initiate__1 signal can be reset at any time with hardware since the transaction control circuit automatically holds initiate__old high until the return busy signal is detected. The number of software instructions needed by the microprocessor to operate this function is therefore reduced.

Although the present invention has been described with reference to preferred embodiments, workers skilled in the art will recognize that changes may be made in form and detail without departing from the spirit and scope of the invention. For example, individual signals can be active high or active low, and corresponding circuitry can be inverted to suit a particular convention. The term "coupled" can include various types of connections or couplings and can include a direct connection or a connection through one or more intermediate components. The terms "initiate" and "busy" are arbitrary terms and can be replaced with other handshaking terms such as "start", "read", "write" and "ready", for example.

What is claimed is:

1. A transaction control circuit for coupling between functional devices in first and second asynchronous clock domains, the circuit comprising:

an initiate input and an initiate output which have active and inactive states;

a busy input and a busy output which have active and inactive states;

initiate control means for setting the initiate output to the active state when the initiate input is in the active state and for holding the initiate output in the active state until the initiate control means senses a transition in the busy input from the inactive state to the active state; and busy control means for setting the busy output to the active state when either the initiate output is in the active state or the busy input is in the active state.

2. The transaction control circuit of claim 1 wherein the initiate control means resets the initiate output to the inactive state when the initiate input is in the inactive state and the busy input in the active state.

3. The transaction control circuit of claim 1 wherein the initiate control means comprises:

a logic-OR circuit comprising first and second inputs and an output, wherein the first input is coupled to the initiate input;

a flip-flop comprising a data input which is coupled to the output of the logic-OR circuit and a data output which forms the initiate output; and a logic-AND circuit comprising a non-inverting input which is coupled to the initiate output, an inverting input which is coupled to the busy input and an output which is coupled to the second input of the logic-OR circuit.

4. The transaction control circuit of claim 3 wherein the initiate control means further comprises:

a first clock terminal which is in the first clock domain;

a second clock terminal which is in the second clock domain;

a synchronizing circuit comprising a data input coupled to the initiate output, a clock input which is coupled to the second clock terminal, and a data output which is synchronized with the second clock domain; and wherein the flip-flop comprises a clock input which is coupled to the first clock terminal.

5. The transaction control circuit of claim 1 wherein the busy control means resets the busy output to the inactive state when the initiate output and the busy input are both in the inactive state.

6. The transaction control circuit of claim 1 wherein the busy control means comprises:

a logic-OR circuit comprising a first input which is coupled to the initiate output, a second input which is coupled to the busy input and an output which forms the busy output.

7. The transaction control circuit of claim 6 wherein the busy control means further comprises:

a first clock terminal which is in the first clock domain; and a synchronizing circuit comprising a data input which is synchronized with the second clock domain, a clock input which is coupled to the first clock terminal, and a data output which forms the busy input and is synchronized with the first clock domain.

8. A transaction control circuit for coupling devices between first and second asynchronous clock domains, the transaction control circuit comprising:

an initiate input and an initiate output;

a busy input and a busy output;

a first logic-OR circuit comprising first and second inputs and an output, wherein the first input is coupled to the initiate input;

a flip-flop comprising a data input which is coupled to the output of the first logic-OR circuit and a data output which forms the initiate output;

a logic-AND circuit comprising a non-inverting input which is coupled to the initiate output, an inverting input which is coupled to the busy input and an output which is coupled to the second input of the first logic-OR gate; and a second logic-OR circuit comprising a first input which is coupled to the initiate output, a second input which is coupled to the busy input and an output which forms the busy output.

9. The transaction control circuit of claim 8 wherein the data output of the flip-flop is synchronized with the first clock domain and wherein the transaction control circuit further comprises:

a first clock terminal which is in the first clock domain;

a second clock terminal which is in the second clock domain;

a first synchronizing circuit comprising a data input which is coupled to the initiate output, a clock input which is coupled to the second clock terminal, and a data output which is synchronized with the second clock domain; and a second synchronizing circuit comprising a data input which is synchronized with the second clock domain, a clock input which is coupled to the first clock terminal and a data output which is coupled to the busy input and is synchronized with the first clock domain.

10. An interface circuit comprising:

first and second clock domains which are asynchronous with one another;

a first functional device which is synchronized with the first clock domain and comprises a transaction initiate output, a busy input and a data port, wherein the first functional device generates an initiate signal on the transaction initiate output;

a second functional device which is synchronized with the second clock domain and comprises a transaction initiate input, a busy output and a data port, wherein the data port of the second functional device is coupled to the data port of the first functional device and wherein the second functional device generates a busy signal on the busy output; and transaction control means for receiving the initiate signal on the transaction initiate output, synchronizing the initiate signal to the second clock domain and applying the synchronized initiate signal to the transaction initiate input, and for receiving the busy signal on the busy output, synchronizing the busy signal to the second clock domain and applying the synchronized busy signal to the busy input.

* * * * *